Oct. 8, 1968     L. E. ELFES ET AL     3,404,768

DRIVE ARRANGEMENT FOR BALE THROWERS

Filed Oct. 5, 1966     2 Sheets-Sheet 1

INVENTORS.
LEE EUGENE ELFES &
EVERETT WINFIELD TODD

Tweedale & Gerhardt
ATTORNEYS.

INVENTORS.
LEE EUGENE ELFES &
EVERETT WINFIELD TODD

ATTORNEYS.

United States Patent Office 3,404,768
Patented Oct. 8, 1968

3,404,768
DRIVE ARRANGEMENT FOR BALE THROWERS
Lee Eugene Elfes, Bloomfield Hills, and Everett Winfield Todd, Dearborn, Mich., assignors to Massey-Ferguson Inc., Detroit, Mich.
Filed Oct. 5, 1966, Ser. No. 584,504
1 Claim. (Cl. 198—128)

ABSTRACT OF THE DISCLOSURE

A bale thrower which is mounted on the rear of a hay baler for swinging motion about a vertical axis is driven from the baler by a longitudinal shaft on the baler which drives, through a belt and pulley drive, a transfer shaft coaxial with the vertical swing axis. The transfer shaft drives the bale thrower through a bevel gear box mounted on the bale thrower. The drive remains effective in all positions of the bale thrower.

---

This invention relates to harvesting machinery and particularly to a novel arrangement for use in a hay baler provided with a pivoted bale thrower, which arrangement enables power to be transmitted between the baler and bale thrower while allowing swinging movements of the bale thrower from side-to-side as required for directing bales in appropriate directions as they are expelled from the bale thrower.

The invention consists in the provision of a separate transfer shaft freely rotatable on an axis coincident with the pivotal axis on which the bale thrower swings and providing a power input connection from the baler to the transfer shaft together with a power output connection from the transfer shaft to the driven shaft of the bale thrower which is positioned usually at right angles or in other non co-planar relation to the transfer shaft.

In the drawings, FIGURE 1 is a front quarter view of a hay baler and bale thrower incorporating a preferred form of the present invention;

Figure 1:
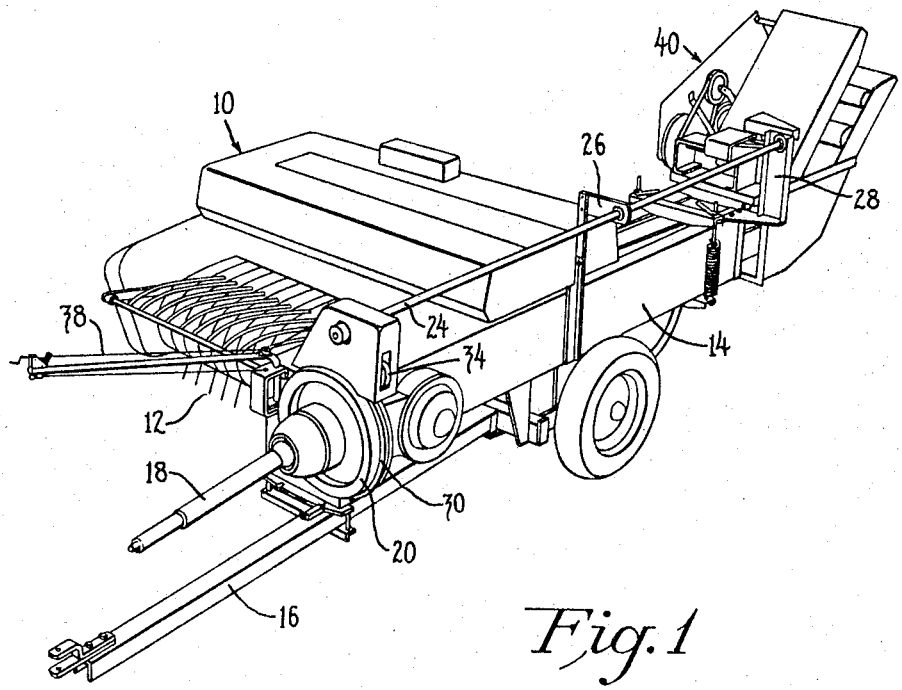

Referring now to FIGURE 1, a field hay baler 10 is illustrated and may be of any conventional type having pick-up means at 12 for picking up a windrow of hay, and also having a bale case 14 through which finished bales are extruded out of the rear of the machine. The baler is provided with a tongue 16 for attachment to a tractor and has a power take-off shaft 18 and fly wheel 20 to be driven by the usual power take-off shaft of the tractor. Alternatively, the baler may be provided with its own independent prime mover rather than taking power from the pulling tractor.

Figure 2:
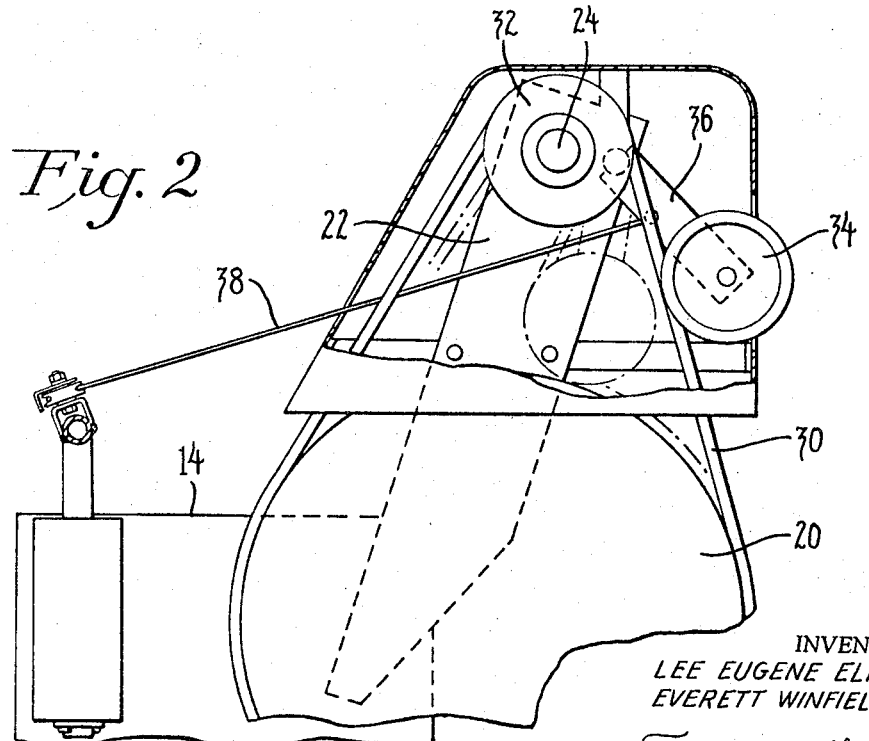
FIGURE 2 is a front view of a portion of the driving arrangements on the baler.

Referring to FIGURE 2, means is provided for delivering power from the fly wheel 20 (or from the prime mover, not shown) to the rear of the baler for driving the bale thrower. Journaled in upstanding bracket 22 is one end of a shaft 24 which extends toward the rear of the machine passing through bearing brackets 26 and 28. The shaft 24 is driven by a belt 30 which is trained over the fly wheel 20 and a pulley 32 carried by the front end of shaft 24. An idler pulley 34 is mounted on a swinging arm 36 and controlled by a manual rope 38 so as to tighten and loosen belt 30 for establishing or interrupting the drive to shaft 24.

The pulley 32 is preferably a spring loaded variable pitch V pulley whereby the speed ratio between fly wheel 20 and shaft 24 may be varied in accordance with the position of the arm 36 and idler pulley 34. Thus, for highest speed drive of shaft 24 the idler 34 may be moved to the position shown in dotted lines, and intermediate speed ratios may be obtained by intermediate positions of the idler. The rope 38 will lead to a position accessible to the operator and will have an anchor point to which it may be secured in various positions.

Figure 3:
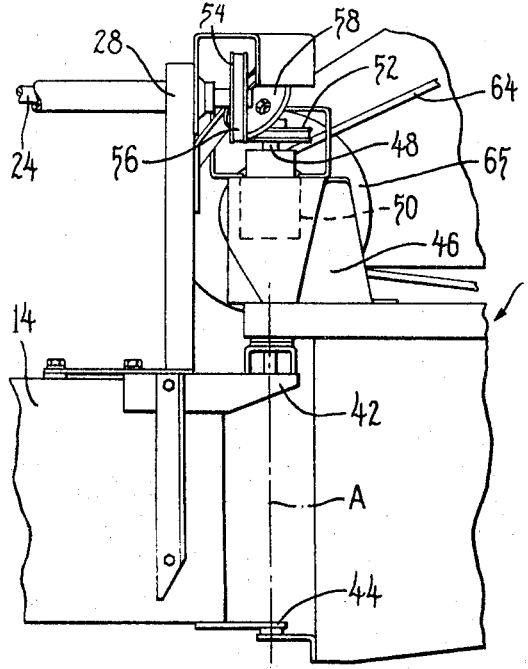
FIGURE 3 is a fragmentary side view of the baler and bale thrower illustrating the pivoting and driving arrangements.
Figure 4:
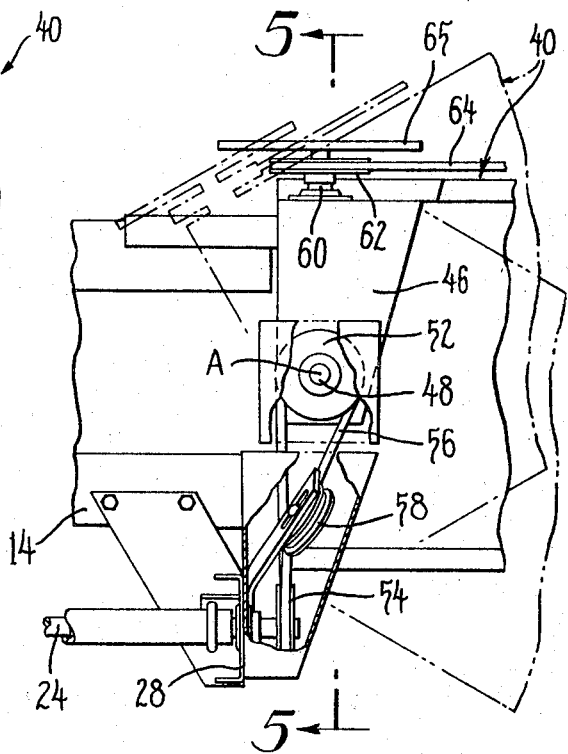
FIGURE 4 is a top view of the mechanism illustrated in FIGURE 3.
Figure 5:
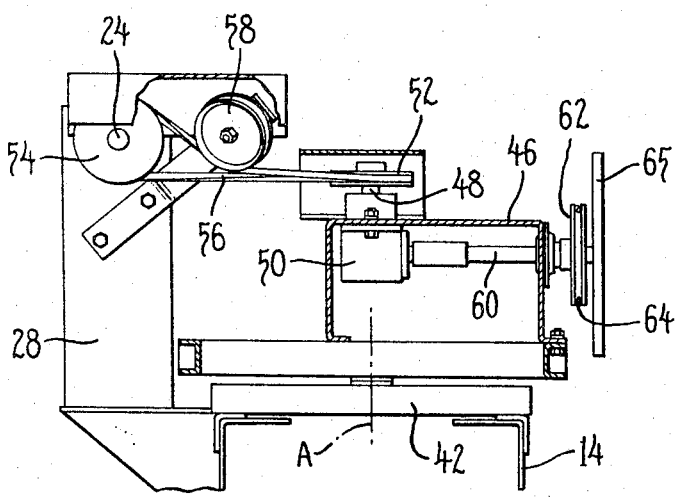
FIGURE 5 is a fragmentary sectional view taken on line 5—5 of FIGURE 4.

Referring now to FIGURES 3, 4 and 5, the bale case 14 carries at its rear end a bale thrower 40 which is mounted on brackets 42 and 44 for swinging movement about the axis A. Secured to the front upper portion of bale thrower 40 is a U shaped supporting housing 46 which forms a support for a vertical transfer shaft 48. The transfer shaft 48 is located above and coincident with axis A. By the term "shaft" is meant either a solid shaft or some other form of rotary member. Preferably, the transfer shaft 48 forms the input shaft to a bevel gear box 50 fastened underneath the top surface of the housing 46. The transfer shaft 48 carries a pulley 52 which is driven from a pulley 54 on the rear end of shaft 24 through a right angle belt drive 56 having an angularly mounted or skewed idler pulley 58, conventionally located so as to guide one reach of the belt in the proper direction between pulleys 52 and 54. The bevel gear box 50 forms part of the driving connection between transfer shaft 48 and a shaft 60 also journaled in the housing 46 and which forms the driven shaft through which power is applied to the bale thrower. The driven shaft 60 carries a pulley 62 at its outer end which serves to drive a belt 64 running to the throwing mechanism of the bale thrower. Shaft 60 may also carry a fly wheel 65.

The operation of the present driving arrangement will best be understood from reference to FIGURES 2, 3, 4 and 5. With the baler operating, shaft 24 may be driven by tensioning the belt 30 through idler 34 at the front of the baler. A pull on rope 38 will shift arm 36 toward its dotted line position for this purpose. The transfer shaft 48 is driven from shaft 24 through belt 56. Because the transfer shaft 48 is on the axis about which the bale thrower swings from side-to-side as shown in dotted lines in FIGURE 4, these movements of the bale thrower do not disturb the relative positions of shaft 24 and shaft 48. Thus, the bale thrower may be swung, or steered, at will from side-to-side without interfering with the drive to the transfer shaft 48. The bevel gear box 50 and shaft 60, being rigidly attached to the bale thrower, likewise do not become relatively displaced in any way by these swinging movements and are able to transmit power received from the transfer shaft with full efficiency regardless of the position of the bale thrower.

It will be understood that other particular driving arrangements from the baler to the transfer shaft and from the transfer shaft to the bale thrower may be utilized so long as the transfer shaft is positioned concidentally with the swing axis. Thus, the right angle belt and pulley drive 52–54–56 and the right angle bevel gear drive 50 could be interchanged, or two right angle belt and pulley drives could be used, or two bevel gear box drives could be used so long as the drive on the baler and the drive on the bale thrower are connected by a common rotary transfer shaft or member located on the swing axis.

We claim the following:
1. In a bale thrower adapted to be attached to the discharge end of a field hay baler on a vertical pivot axis, bale throwing mechanism, power transmitting mechanism for transmitting power between the baler and the bale throwing mechanism including a first transfer shaft supported for rotation on said vertical axis, power input means including a pulley mounted on said first transfer shaft and adapted to be driven, by means of a belt, from power means on the baler, a second transfer shaft arranged at right angles to said first transfer shaft, gear means drivingly connecting said shafts, and power output means including a second pulley mounted on said second transfer shaft and connected by belt means to drive said bale throwing mechanism.

References Cited

UNITED STATES PATENTS

| | | | |
|---|---|---|---|
| 306,772 | 10/1884 | Pratt et al. | 74—228 X |
| 2,099,070 | 11/1937 | Lundbye | 74—380 X |
| 2,765,666 | 10/1959 | Haug | 74—228 |
| 3,235,061 | 2/1966 | Craig | 198—128 |
| 3,291,284 | 12/1966 | May et al. | 198—128 |
| 3,307,680 | 3/1967 | Luedtke | 198—128 |

RICHARD E. ALGERTER, *Primary Examiner.*

M. L. AJEMAN, *Assistant Examiner.*